United States Patent [19]

Nakano et al.

[11] Patent Number: 5,302,645
[45] Date of Patent: Apr. 12, 1994

[54] POLYETHYLENE TEREPHTHALATE COMPOSITION

[75] Inventors: Seiko Nakano; Kiyoharu Yada, both of Mie, Japan

[73] Assignee: Mitsubishi Petrochemical Co., Ltd., Tokyo, Japan

[21] Appl. No.: 921,388

[22] Filed: Jul. 30, 1992

Related U.S. Application Data

[63] Continuation of Ser. No. 690,580, Apr. 24, 1991, abandoned.

[30] Foreign Application Priority Data

Apr. 26, 1990 [JP] Japan .................................. 2-108700
Jun. 4, 1990 [JP] Japan .................................. 2-144554

[51] Int. Cl.$^5$ ............................................. C08K 5/524
[52] U.S. Cl. ..................... 524/120; 524/147; 524/494; 524/505; 524/508; 524/513; 524/153
[58] Field of Search ................ 524/120, 47, 499, 505, 524/508, 513

[56] References Cited

U.S. PATENT DOCUMENTS

| | | | |
|---|---|---|---|
| 4,753,975 | 6/1988 | Vanderkooi, Jr. | 524/513 |
| 4,753,980 | 6/1988 | Deyrup | 524/513 |
| 4,956,407 | 9/1990 | Funasaki et al. | 524/120 |
| 4,970,256 | 11/1990 | Inoue et al. | 524/508 |

FOREIGN PATENT DOCUMENTS

| | | |
|---|---|---|
| 217516 | 2/1983 | Japan . |
| 58-217516(A) | 12/1983 | Japan . |
| 228527 | 3/1985 | Japan . |
| 60-228527(A) | 11/1985 | Japan . |

Primary Examiner—Kriellion S. Morgan
Attorney, Agent, or Firm—Oblon, Spivak, McClelland, Maier & Neustadt

[57] ABSTRACT

Disclosed is a polyethylene terephthalate composition comprising:

(A) 100 parts by weight of polyethylene terephthalate,
(B) 1 to 25 parts by weight of a bisphenol type epoxy resin having an epoxy equivalent of 1000 or less,
(C) 5 to 50 parts by weight of a thermoplastic resin,
(D) 0 to 10 parts by weight of a modified thermoplastic resin containing at least one epoxy group, carboxyl group or carboxylic anhydride in a molecular chain of one molecule,
(E) 0.1 to 2 parts by weight of a phosphorus type stabilizer and
(F) 5 to 150 parts by weight of a glass fiber, wherein the composition has thermal stability, and is small in change of physical properties such as fluidity even when the composition dwells in a molding machine for a long time.

9 Claims, No Drawings

POLYETHYLENE TEREPHTHALATE COMPOSITION

This application is a continuation of application Ser. No. 07/690,580, filed on Apr. 24, 1991, now abandoned.

BACKGROUND OF THE INVENTION

This invention relates to a polyethylene terephthalate composition improved in molding workability, which can give stable physical properties of a molded product even when a slight amount of water exists at the time of molding working and the composition dwells in a molding machine for a long time.

Polyethylene terephthalate has been used widely in various industrial fields as engineering plastic having excellent mechanical and physical properties. However, since polyethylene terephthalate is a polyester having a high melting point, it has a drawback that hydrolysis occurs within an extremely short time at the time of molding working due to a small amount of water contained in pellets, whereby mechanical and physical properties of a molded product are lowered significantly and also "molding flash"0 is formed on a parting line of a product.

In order to solve such a drawback of polyethylene terephthalate, many techniques to cope with the drawback have been reported, but the drawback has not yet solved completely.

Thus, when polyethylene terephthalate is molded, it is still required that before molding, a pellet should be dried sufficiently, supplied in a molding machine while keeping its water content 100 to 200 ppm, and heated and melted within a short time to complete an operation. Under the present conditions, although polyethylene terephthalate has excellent mechanical, physical and thermal properties inherently when compared with polybutylene terephthalate, development of its market has been delayed because of such cumbersome water control of pellets and control of molding conditions.

Previously, the present inventors accomplished an invention to solve these problems of a polyethylene terephthalate composition (Japanese Provisional Patent Publication No. 302462/1990), and further investigated to solve the above-mentioned problems by using another composition.

SUMMARY OF THE INVENTION

The present inventors found that by combining polyethylene terephthalate with a specific epoxy resin, a specific thermoplastic resin and a specific phosphorus type stabilizer within specific ranges, extremely stable moldability can be retained even when water is contained or a composition dwells in a molding machine for a long time, to accomplish the present invention.

That is, the present invention is a polyethylene terephthalate composition comprising:

(A) 100 parts by weight of polyethylene terephthalate, (B) 1 to 25 parts by weight of a bisphenol type epoxy resin having an epoxy equivalent of 1000 or less, (C) 5 to 50 parts by weight of a thermoplastic resin, (D) 0 to 10 parts by weight of a modified thermoplastic resin containing at least one epoxy group, carboxyl group or carboxylic anhydride in a molecular chain per one molecule, (E) 0.1 to 2 parts by weight of a phosphorus type stabilizer and (F) 5 to 150 parts by weight of a glass fiber.

DESCRIPTION OF THE PREFERRED EMBODIMENTS

In the following, the constitution of the composition according to the present invention is described in more detail.

Component (A)

The polyethylene terephthalate which is Component (A) to be used in the present invention refers to a polymer obtained by polycondensation using terephthalic acid or an ester-forming derivative thereof as an acid component and ethylene glycol or an ester-forming derivative thereof as a glycol component. In this case, as an acid component and a glycol component, 30 mole % of less of other kinds of dicarboxylic acid, glycol or ester-forming derivatives thereof may be contained without any problem. Such other kinds of copolymerization components may include, for example, dicarboxylic acids such as isophthalic acid, naphthalene-2,6-dicarboxylic acid and adipic acid; and glycols such as trimethylene glycol, tetramethylene glycol, hexamethylene glycol, diethylene glycol, cyclohexanediol, 1,4-bis(oxyethoxy)benzene, bisphenol A, polyethylene glycol and polypropylene glycol, and ester-forming derivatives thereof. Such components may further include a mixture of polyethylene terephthalate and a polyester comprising the above other acid component and the glycol component such as polybutylene terephthalate at desired mixing ratios.

The intrinsic viscosity of the polyethylene terephthalate to be used in the present invention measured by using a solvent mixture of phenol and tetrachloroethane at a weight ratio of 1:1 at 23° C. is desirably 0.4 to 1.2 dl/g, particularly in the range of 0.5 to 0.8 dl/g. When polyethylene terephthalate having an intrinsic viscosity of less than 0.4 dl/g is used, not only the effect of inhibiting "molding flash" of a molded product is small, but also strength of a product obtained is low unpractically. When polyethylene terephthalate having an intrinsic viscosity exceeding 1.2 dl/g is used, fluidity of a composition is extremely poor, and molding can be hardly performed.

Component (B)

The bisphenol type epoxy resin which is Component (B) to be used in the present invention is particularly preferably a bisphenol A type epoxy resin obtained by reacting bisphenol A with epichlorohydrin. Its epoxy equivalent is 1000 or less, desirably 500 or less, more desirably 300 or less. In this specification, the epoxy equivalent means gram of the epoxy resin containing 1 gram equivalent of an epoxy group.

Component (C)

The thermoplastic resin which is Component (C) to be used in the present invention is a thermoplastic resin which has sufficient thermal stablity at a melting temperature of polyethylene terephthalate, can be melted and mixed moderately and is not separated at a surface layer at the time of molding. For example, there may be included a styrene type resin, an olefin type resin such as polyethylene, polypropylene and an ethylene.propylene copolymer, a polyamide resin, polyphenylene ether, polycarbonate, polyphenylene sulfide or polyacrylate. Particularly preferred are a styrene type resin, a propylene type resin, polyphenylene ether and polycarbonate.

Component (D)

By adding Component (D), a composition having high weld strength can be obtained.

The modified thermoplastic resin (D) to be used in the present invention is a thermoplastic resin containing at least one epoxy group, carboxyl group or carboxylic anhydride in a molecular chain per one molecule. For example, there may be included an olefin copolymer resin such as an ethylene-vinyl acetate-glycidyl (meth)acrylate copolymer, an ethylene-glycidyl (meth)acrylate copolymer and an ethylene-acrylic acid copolymer; a modified olefin resin such as glycidyl methacrylate graft polypropylene and maleic anhydride graft polyethylene; and a styrene copolymer resin such as a styrene-maleic anhydride copolymer, a styrene-acrylonitrile-maleic anhydride copolymer, a styrene-glycidyl methacrylate copolymer and a styrene-methyl methacrylate-glycidyl methacrylate copolymer.

Component (E)

The phosphorus type stabilizer which is Component (E) to be used in the present invention is phosphite having a structure represented by the formula:

$$(RO)_3P$$

wherein R represents a hydrocarbon group having 2 to 20, preferably 4 to 16 carbon atoms (a cyclic hydrocarbon group is included).

For example, there may be included trisalkyl phosphite, tris(alkylaryl)phosphite, bisphenol type phosphite and pentaerythritol type phosphite. Particularly preferred is pentaerythritol type phosphite.

Component (F)

The glass fiber which is Component (F) to be used in the present invention may be any glass fiber generally used for reinforcing a resin. For example, a long (roving) type glass fiber and a short (chopped strand) type glass fiber can be selected and used. Further, the glass fiber may be treated with a bundling agent (e.g. polyvinyl acetate and polyester), a coupling agent (e.g. a silane compound and a borane compound) and other finishing agent.

Formulation Ratio

The amount of the bisphenol type epoxy resin (B) to be formulated is 1 to 25 parts by weight, preferably 2 to 20 parts by weight, more preferably 3 to 15 parts by weight based on 100 parts by weight of the polyethylene terephthalate (A). If the amount is less than 1 part by weight the effect of the present invention is small, while it exceeds 25 parts by weight, many "molding flashes" are formed and also fluidity becomes unstable, whereby "leakage phenomenon" (leakage of a melted resin from an end nozzle of an injection molding machine) occurs during injection molding.

The amount of the thermoplastic resin (C) to be formulated is 5 to 50 parts by weight, preferably 10 to 45 parts by weight, more preferably 21 to 40 parts by weight based on 100 parts by weight of the polyethylene terephthalate (A). If the amount is less than 5 parts by weight, the effect of the present invention is small, while it exceeds 50 parts by weight, mechanical strength of a product is lowered significantly.

The amount of the modified thermoplastic resin (D) to be formulated is 0 to 10 parts by weight, preferably 0.5 to 8 parts by weight, more preferably 1 to 5 parts by weight based on 100 parts by weight of the polyethylene terephthalate (A). Even if an amount exceeding 10 parts by weight is formulated, effect which can be obtained thereby is small.

The amount of the phosphorus type stabilizer (E) to be formulated is 0.1 to 2 parts by weight, preferably 0.15 to 1.8 parts by weight, more preferably 0.2 to 1.5 parts by weight based on 100 parts by weight of the polyethylene terephthalate (A). If the amount is less than 0.1 part by weight, the effect of the present invention is small, while it exceeds 2 parts by weight, effect will not be proportional to the amount added uneconomically.

The amount of the glass fiber (F) to be formulated is 5 to 150 parts by weight, preferably 10 to 130 parts by weight based on 100 parts by weight of the polyethylene terephthalate (A). If the amount is less than 5 parts by weight, reinforcing effect by the glass fiber is insufficient, while it exceeds 150 parts by weight, fluidity and appearance of a production will be deteriorated significantly.

Mixing and Kneading

The composition of the present invention can be prepared by conventional mixer and kneader. That is, after the respective components are thrown into a V blender, a ribbon mixer or a tumbler, and mixed homogeneously, a mixture is melted and kneaded by a conventional monoaxial or biaxial extruder, cooled and then cut into pellets. In this case, the glass fiber and a part of the other components may be added to from the middle portion of an extruder. Further, after previous mixing and kneading of a part of the components, the remaining components may be added and extruded.

In the composition of the present invention, there may be formulated a flame-retardant (e.g. brominated bisphenol, a brominated epoxy resin, brominated polystyrene, brominated polycarbonate, triphenyl phosphate, amide phosphonate and red phosphorus), a flame-retardant aid (e.g. antimony trioxide and sodium antimonate), an inorganic filler (e.g. calcium carbonate, silica, talc, mica, potassium silicate and potassium titanate), a nucleating agent (e.g. sodium stearate and an ethylene-sodium acrylate copolymer), a stabilizer (e.g. phosphate and phosphite), an antioxidant (e.g. a hindered phenol type compound), a light stabilizer, a colorant, a forming agent, a lubricant, a releasing agent and an antistatic agent, within the range which does not impair the object of the present invention.

Further, a thermosetting resin (e.g. a phenol resin, melamine resin and a silicone resin) and a soft thermoplastic resin (e.g. an ethylene-propylene terpolymer, an ethylene-vinyl acetate copolymer and a polyester elastomer) may be added.

The composition thus obtained can be molded easily according to a conventional method such as injection molding, extrusion molding, compression molding or rotational molding.

EXAMPLES

The present invention is described in detail by referring to Examples and Comparative examples.

EXAMPLE 1

Polyethylene terephthalate having an intrinsic viscosity of 0.7 dl/g (measured in a 1:1 mixture of phenol and tetrachloroethane at 23° C.), BELLPET PBK-1, polyethylene terephthalate (trade name, manufactured by Kanebo K.K.) as Component (A), EPIKOTE 828, BISphenol A type epoxy resin (trade name, manufactured by Yuka Shell Epox K.K., epoxy equivalent: 190) as Component (B) DIALEX HT 76, high impact polystyrene (trade name manufactured by Mitsubishi Monsant K.K., high impact polystyrene) as Component (C), MARK PEP 36, pentaerythritol type phosphite (trade name, manufactured by Adeca Argus Kagaku K.K.) as Component (E) and a glass fiber T198H (trade name, manufactured by Nippon Denki Glass K.K.) as Component (F) were mixed at formulation ratios shown in Table 1 (Component (F) formulated was 30% by weight based on the whole composition) by a tumbler having a volume of 10 liter. Subsequently, the mixture was melted and kneaded by using a monoaxial extruder having a screw diameter of 40 mm equipped with a bent while setting a cylinder temperature at 260° C., and then strand cut to obtain pellets for molding. After the water content of the pellets was controlled to two levels of about 100 ppm and 1000 ppm under different drying conditions, a molding test strip was obtained by using a 6-ounce injection molding machine N-100BII (trade name, manufactured by Nippon Seikosho K.K.), setting a cylinder temperature at 265° C., and employing a mold temperature of 90° C., a cooling time of 20 seconds and a total molding cycle of 35 seconds (average dwelling time in a cylinder: 2 minutes). In the compositions similarly formulated, the injection pressure was made uniform to be an optimum pressure at which "molding flash" was not formed when pellets having a water content of 100 ppm were molded at a molding cycle of 35 seconds.

The formation of "molding flash" was evaluated by using the following 4 ranks.

X: Observed on the whole periphery of a test strip

Δ: Observed on the whole periphery of a test strip, although the extent is small.

○: Observed only in the vicinity of the gate

⊚: Not observed

The tensile strength and Izod (non-notch) impact strength were measured according to JIS K7113 and JIS K7110, and the results are shown in Table 1.

COMPARATIVE EXAMPLES 1 TO 7

In the same manner as in Example 1, comparative samples were prepared except for using components as shown in Table 1.

For comparison, the pellets were injected after dwelling in a molding machine for 10 minutes, to obtain a molding test strip for comparison.

These samples were measured in the same manner as in Example 1. The results are shown in Table 1.

From Table 1, it can be seen that in the composition of the present invention, the mechanical strength was not lowered at all and an extremely small number of "molding flashes" were formed even when molding is performed under a water content condition of 1000 ppm and the compositions dwelled in a molding machine for a long time, i.e. 10 minutes, when compared with the compositions of Comparative examples 1 to 7 in which at least one of Components (B), (C) and (E) was not used.

TABLE 1

| | Composition (part by weight) | | | | | Water content of pellet (ppm) | Dwelling time in cylinder (min) | Characteristics | | Molding flash |
| | | | | | | | | Tensile strength (kg/cm$^2$) | Izod non-notch (kg · cm/cm$^2$) | |
| | A | B | C | E | F | | | | | |
| Example 1 | 100 | 10 | 20 | 0.5 | 55.9 | 98 | 2 | 1800 | 60 | ⊚ |
| | | | | | | 98 | 10 | 1810 | 62 | ⊚ |
| | | | | | | 1005 | 2 | 1780 | 58 | ⊚ |
| | | | | | | 1005 | 10 | 1710 | 55 | ○ |
| Comparative example | | | | | | | | | | |
| 1 | 100 | 0 | 0 | 0 | 42.9 | 102 | 2 | 1850 | 72 | ⊚ |
| | | | | | | 102 | 10 | 1550 | 42 | X |
| | | | | | | 1002 | 2 | 1280 | 31 | X |
| | | | | | | 1002 | 10 | 810 | 14 | X |
| 2 | 100 | 10 | 0 | 0 | 47.1 | 102 | 2 | 1850 | 64 | ⊚ |
| | | | | | | 102 | 10 | 1600 | 51 | Δ |
| | | | | | | 1001 | 2 | 1300 | 36 | X |
| | | | | | | 1001 | 10 | 880 | 25 | X |
| 3 | 100 | 0 | 20 | 0 | 51.4 | 102 | 2 | 1780 | 57 | ⊚ |
| | | | | | | 102 | 10 | 1500 | 38 | Δ |
| | | | | | | 998 | 2 | 1210 | 31 | X |
| | | | | | | 998 | 10 | 830 | 20 | X |
| 4 | 100 | 0 | 0 | 0.5 | 43.1 | 98 | 2 | 1850 | 70 | ⊚ |
| | | | | | | 98 | 10 | 1590 | 46 | X |
| | | | | | | 1005 | 2 | 1380 | 36 | X |
| | | | | | | 1005 | 10 | 930 | 21 | X |
| 5 | 100 | 10 | 20 | 0 | 55.7 | 103 | 2 | 1820 | 60 | ⊚ |
| | | | | | | 103 | 10 | 1500 | 43 | Δ |
| | | | | | | 1002 | 2 | 1250 | 30 | Δ |
| | | | | | | 1002 | 10 | 800 | 15 | X |
| 6 | 100 | 10 | 0 | 0.5 | 47.4 | 97 | 2 | 1830 | 61 | ⊚ |
| | | | | | | 97 | 10 | 1800 | 57 | ○ |
| | | | | | | 1003 | 2 | 1540 | 44 | Δ |
| | | | | | | 1003 | 10 | 1000 | 30 | X |
| 7 | 100 | 0 | 20 | 0.5 | 51.6 | 100 | 2 | 1770 | 55 | ⊚ |
| | | | | | | 100 | 10 | 1750 | 52 | ○ |
| | | | | | | 997 | 2 | 1310 | 36 | X |
| | | | | | | 997 | 10 | 960 | 28 | X |

EXAMPLES 2 TO 7

TABLE 2

| | Composition (part by weight) | | | | | Water content of pellet (ppm) | Dwelling time in cylinder (min) | Characteristics | | Molding flash |
|---|---|---|---|---|---|---|---|---|---|---|
| | A | B | C | E | F | | | Tensile strength (kg/cm$^2$) | Izod non-notch (kg·cm/cm$^2$) | |
| Example | | | | | | | | | | |
| 2 | 100 | 2 | 20 | 0.5 | 52.5 | 102 | 2 | 1780 | 57 | ⊙ |
| | | | | | | 102 | 10 | 1750 | 55 | ○ |
| | | | | | | 1007 | 2 | 1700 | 51 | ○ |
| | | | | | | 1007 | 10 | 1610 | 49 | ○ |
| 3 | 100 | 20 | 20 | 0.5 | 60.2 | 95 | 2 | 1810 | 61 | ⊙ |
| | | | | | | 95 | 10 | 1830 | 65 | ○ |
| | | | | | | 1001 | 2 | 1830 | 60 | ○ |
| | | | | | | 1001 | 10 | 1750 | 58 | ○ |
| 4 | 100 | 10 | 10 | 0.5 | 51.6 | 99 | 2 | 1830 | 63 | ⊙ |
| | | | | | | 99 | 10 | 1800 | 60 | ○ |
| | | | | | | 1003 | 2 | 1790 | 60 | ○ |
| | | | | | | 1003 | 10 | 1730 | 56 | △ |
| 5 | 100 | 10 | 40 | 0.5 | 64.5 | 102 | 2 | 1750 | 54 | ⊙ |
| | | | | | | 102 | 10 | 1740 | 53 | ⊙ |
| | | | | | | 1010 | 2 | 1710 | 50 | ⊙ |
| | | | | | | 1010 | 10 | 1680 | 49 | ○ |
| 6 | 100 | 10 | 20 | 0.2 | 55.8 | 97 | 2 | 1800 | 60 | ⊙ |
| | | | | | | 97 | 10 | 1790 | 59 | ⊙ |
| | | | | | | 1008 | 2 | 1750 | 55 | ⊙ |
| | | | | | | 1008 | 10 | 1700 | 51 | ○ |
| 7 | 100 | 10 | 20 | 1 | 56.1 | 96 | 2 | 1820 | 62 | ⊙ |
| | | | | | | 96 | 10 | 1820 | 64 | ⊙ |
| | | | | | | 1003 | 2 | 1790 | 59 | ⊙ |
| | | | | | | 1003 | 10 | 1700 | 52 | ○ |
| Comparative example | | | | | | | | | | |
| 8 | 100 | 0.5 | 20 | 0.5 | 51.9 | 98 | 2 | 1780 | 54 | ⊙ |
| | | | | | | 98 | 10 | 1750 | 51 | ○ |
| | | | | | | 1005 | 2 | 1320 | 38 | △ |
| | | | | | | 1005 | 10 | 990 | 32 | X |
| 9 | 100 | 30 | 20 | 0.5 | 64.5 | 99 | 2 | 1750 | 54 | ⊙ |
| | | | | | | 99 | 10 | — | — | leakage |
| | | | | | | 989 | 2 | 1700 | 50 | △ |
| | | | | | | 989 | 10 | — | — | leakage |
| 10 | 100 | 10 | 3 | 0.5 | 48.6 | 102 | 2 | 1800 | 58 | ⊙ |
| | | | | | | 102 | 10 | 1780 | 56 | ○ |
| | | | | | | 1002 | 2 | 1530 | 46 | X |
| | | | | | | 1002 | 10 | 1010 | 29 | X |
| 11 | 100 | 10 | 60 | 0.5 | 73.1 | 100 | 2 | 1510 | 43 | ⊙ |
| | | | | | | 100 | 10 | 1500 | 42 | ⊙ |
| | | | | | | 994 | 2 | 1430 | 30 | ⊙ |
| | | | | | | 994 | 10 | 1300 | 24 | △ |
| 12 | 100 | 10 | 20 | 0.05 | 55.7 | 103 | 2 | 1810 | 61 | ⊙ |
| | | | | | | 103 | 10 | 1800 | 58 | ○ |
| | | | | | | 997 | 2 | 1300 | 36 | △ |
| | | | | | | 997 | 10 | 1000 | 27 | X |
| 13 | 100 | 10 | 20 | 3 | 57.0 | 99 | 2 | 1830 | 61 | ⊙ |
| | | | | | | 99 | 10 | 1810 | 62 | ⊙ |
| | | | | | | 1004 | 2 | 1800 | 58 | ⊙ |
| | | | | | | 1004 | 10 | 1750 | 55 | ○ |

The same procedures were carried out in the same manner as in Example 1 except for changing the formulation ratio of Components (B), (C) and (E). The results are shown in Table 2.

COMPARATIVE EXAMPLES 8 TO 13

The same procedures were carried out in the same manner as in Examples 2 to 7. The results are shown in Table 2.

From Table 2, it can be seen that the amount of Epikote E828 (trade name) to be formulated is preferably 1 to 30 parts by weight, the amount of DIALEX HT 76, high impact polystyrene (trade name) to be formulated 5 to 50 parts by weight, and the amount of MARK PEP 36, pentaerythritol type phosphite (trade name) to be formulated 0.1 to 2 parts by weight based on 100 parts by weight of polyethylene terephthalate.

EXAMPLES 8 AND 9

The experiment was carried out in the same manner as in Example 1 except for using a bisphenol A type epoxy resin having a different epoxy equivalent as Component (B). The results are shown in Table 3.

COMPARATIVE EXAMPLE 14

The experiment was carried out in the same manner as in Examples 8 and 9. The results are shown in Table 3.

The results are compared with those of Example 1 and shown in Table 3. From Table 3, it can be seen that when the epoxy equivalent of the bisphenol A type epoxy resin is more than 1000, the effect of the present invention cannot be obtained.

TABLE 3

| (B) Kind | Epoxy equivalent | Water content of pellet (ppm) | Dwelling time in cylinder (min) | Tensile strength (kg/cm$^2$) | Izod non-notch (kg·cm/cm$^2$) | Molding flash |
|---|---|---|---|---|---|---|
| Example | | | | | | |
| 1  Epicote E828 | 190 | 98 | 2 | 1800 | 60 | ⊚ |
|  |  | 98 | 10 | 1810 | 62 | ⊚ |
|  |  | 1005 | 2 | 1780 | 58 | ⊚ |
|  |  | 1005 | 10 | 1710 | 55 | ○ |
| 8  Epicote E1001 | 495 | 102 | 2 | 1710 | 54 | ⊚ |
|  |  | 102 | 10 | 1730 | 55 | ⊚ |
|  |  | 1003 | 2 | 1700 | 52 | ○ |
|  |  | 1003 | 10 | 1680 | 50 | ○ |
| 9  Epicote E1004 | 900 | 99 | 2 | 1700 | 53 | ⊚ |
|  |  | 99 | 10 | 1720 | 54 | ⊚ |
|  |  | 998 | 2 | 1690 | 51 | ○ |
|  |  | 998 | 10 | 1680 | 50 | ○ |
| Comparative example 14  Epicote E1009 | 2000 | 100 | 2 | 1680 | 52 | ⊚ |
|  |  | 100 | 10 | 1670 | 50 | ○ |
|  |  | 1005 | 2 | 1410 | 41 | X |
|  |  | 1005 | 10 | 1200 | 32 | X |

EXAMPLE 10

The experiment was carried out in the same manner as in Example 1 except for using an ethylene-propylene block copolymer BC8Q (trade name, manufactured by Mitsubishi Yuka K.K.) as Component (C). The results are shown in Table 4.

COMPARATIVE EXAMPLES 15 TO 17

The experiment was carried out in the same manner as in Example 10. The results are shown in Table 4.

From Table 4, it can be seen that even when a propylene type resin is used as Component (C), the same effect relative to water content of a pellet and dwelling time in a cylinder can be obtained.

EXAMPLE 11

The experiment was carried out in the same manner as in Example 1 except for using polycarbonate S-1000 (trade name, manufactured by Mitsubishi Gas Kagaku K.K.) as Component (C). The results are shown in Table 5.

COMPARATIVE EXAMPLES 18 TO 20

The experiment was carried out in the same manner as in Example 11. The results are shown in Table 5.

From Table 5, it can be seen that even when polycarbonate is used as Component (C), the same effect relative to water content and dwelling time can be obtained.

TABLE 4

| | Composition (part by weight) | | | | | Water content of pellet (ppm) | Dwelling time in cylinder (min) | Tensile strength (kg/cm$^2$) | Izod non-notch (kg·cm/cm$^2$) | Molding flash |
|---|---|---|---|---|---|---|---|---|---|---|
| | A | B | C | E | F | | | | | |
| Example 10 | 100 | 10 | 25 | 0.5 | 58.1 | 95 | 2 | 1750 | 54 | ⊚ |
| | | | | | | 95 | 10 | 1740 | 53 | ⊚ |
| | | | | | | 1003 | 2 | 1700 | 51 | ⊚ |
| | | | | | | 1003 | 10 | 1690 | 50 | ⊚ |
| Comparative example 15 | 100 | 0 | 25 | 0 | 58.1 | 98 | 2 | 1700 | 51 | ⊚ |
| | | | | | | 98 | 10 | 1440 | 44 | ○ |
| | | | | | | 999 | 2 | 1200 | 27 | X |
| | | | | | | 999 | 10 | 810 | 15 | X |
| 16 | 100 | 10 | 25 | 0 | 58.1 | 101 | 2 | 1710 | 53 | ⊚ |
| | | | | | | 101 | 10 | 1480 | 41 | △ |
| | | | | | | 1005 | 2 | 1300 | 31 | △ |
| | | | | | | 1005 | 10 | 890 | 20 | X |
| 17 | 100 | 0 | 25 | 0.5 | 58.1 | 102 | 2 | 1710 | 50 | ⊚ |
| | | | | | | 102 | 10 | 1720 | 48 | △ |
| | | | | | | 1003 | 2 | 1280 | 40 | X |
| | | | | | | 1003 | 10 | 990 | 30 | X |

TABLE 5

| | Composition (part by weight) | | | | | Water content of pellet (ppm) | Dwelling time in cylinder (min) | Tensile strength (kg/cm$^2$) | Izod non-notch (kg·cm/cm$^2$) | Molding flash |
|---|---|---|---|---|---|---|---|---|---|---|
| | A | B | C | E | F | | | | | |
| Example 11 | 100 | 10 | 20 | 0.5 | 55.9 | 103 | 2 | 1850 | 66 | ⊚ |
| | | | | | | 103 | 10 | 1830 | 64 | ⊚ |
| | | | | | | 1010 | 2 | 1780 | 64 | ⊚ |
| | | | | | | 1010 | 10 | 1750 | 61 | ○ |
| Comparative | | | | | | | | | | |

TABLE 5-continued

| | Composition (part by weight) | | | | | Water content of pellet (ppm) | Dwelling time in cylinder (min) | Characteristics | | Molding flash |
|---|---|---|---|---|---|---|---|---|---|---|
| | A | B | C | E | F | | | Tensile strength (kg/cm$^2$) | Izod non-notch (kg·cm/cm$^2$) | |
| example | | | | | | | | | | |
| 18 | 100 | 0 | 20 | 0 | 51.4 | 98 | 2 | 1810 | 62 | ⊚ |
| | | | | | | 98 | 10 | 1530 | 50 | ○ |
| | | | | | | 1003 | 2 | 1380 | 42 | X |
| | | | | | | 1003 | 10 | 1100 | 33 | X |
| 19 | 100 | 10 | 20 | 0 | 55.7 | 95 | 2 | 1850 | 65 | ⊚ |
| | | | | | | 95 | 10 | 1520 | 51 | ○ |
| | | | | | | 1008 | 2 | 1400 | 45 | △ |
| | | | | | | 1008 | 10 | 1100 | 34 | X |
| 20 | 100 | 0 | 20 | 0.5 | 51.6 | 99 | 2 | 1830 | 64 | ⊚ |
| | | | | | | 99 | 10 | 1750 | 60 | ⊚ |
| | | | | | | 995 | 2 | 1390 | 40 | X |
| | | | | | | 995 | 10 | 1110 | 32 | X |

EXAMPLE 12

The experiment was carried out in the same manner as in Example 1 except for using polyphenylene ether (manufactured by Nippon Ether K.K., intrinsic viscosity: 0.50 (chloroform solution, 30° C.)) as Component (C). The results are shown in Table 6.

COMPARATIVE EXAMPLES 21 TO 23

The experiment was carried out in the same manner as in Example 12. The results are shown in Table 6.

From Table 6, it can be seen that even when polyphenylene ether is used as Component (C), the same effect relative to water content and dwelling time can be obtained.

EXAMPLES 13 AND 14

The experiment was carried out in the same manner as in Example 1 except for using polyethylene terephthalate.polybutylene terephthalate mixtures A-1 and A-2 in which the polyethylene terephthalate used in Example 1 and polybutylene terephthalate NOVADOL 5010 (trade name, manufactured by Mitsubishi Kasei K.K.) were mixed at weight ratios of 7:3 and 3:7 as Component (A). The results are shown in Table 7.

COMPARATIVE EXAMPLES 24 TO 37

The experiment was carried out in the same manner as in Examples 13 and 14. The results are shown in Table 7.

From Table 7, it can be seen that in the case of using any desired mixture of polyethylene terephthalate and polybutylene terephthalate as Component (A), if the technique of the present invention is not used, lowering in physical properties due to water content and dwelling time is observed even when the amount of polybutylene terephthalate is large.

TABLE 6

| | Composition (part by weight) | | | | | Water content of pellet (ppm) | Dwelling time in cylinder (min) | Characteristics | | Molding flash |
|---|---|---|---|---|---|---|---|---|---|---|
| | A | B | C | E | F | | | Tensile strength (kg/cm$^2$) | Izod non-notch (kg·cm/cm$^2$) | |
| Example 12 | 100 | 10 | 20 | 0.5 | 55.9 | 103 | 2 | 1810 | 62 | ⊚ |
| | | | | | | 103 | 10 | 1820 | 64 | ⊚ |
| | | | | | | 994 | 2 | 1740 | 60 | ⊚ |
| | | | | | | 994 | 10 | 1710 | 58 | ○ |
| Comparative example | | | | | | | | | | |
| 21 | 100 | 0 | 20 | 0 | 51.4 | 99 | 2 | 1780 | 59 | ⊚ |
| | | | | | | 99 | 10 | 1500 | 48 | ○ |
| | | | | | | 1003 | 2 | 1330 | 43 | △ |
| | | | | | | 1003 | 10 | 1010 | 30 | X |
| 22 | 100 | 10 | 20 | 0 | 55.7 | 96 | 2 | 1790 | 62 | ⊚ |
| | | | | | | 96 | 10 | 1600 | 49 | ○ |
| | | | | | | 1007 | 2 | 1380 | 43 | △ |
| | | | | | | 1007 | 10 | 990 | 30 | X |
| 23 | 100 | 0 | 20 | 0.5 | 51.6 | 104 | 2 | 1790 | 62 | ⊚ |
| | | | | | | 104 | 10 | 1680 | 57 | ○ |
| | | | | | | 1008 | 2 | 1390 | 48 | X |
| | | | | | | 1008 | 10 | 990 | 29 | X |

TABLE 7

| | Composition (part by weight) | | | | | | Water content of pellet (ppm) | Dwelling time in cylinder (min) | Characteristics | | Molding flash |
|---|---|---|---|---|---|---|---|---|---|---|---|
| | A-1 | A-2 | B | C | E | F | | | Tensile strength (kg/cm$^2$) | Izod non-notch (kg·cm/cm$^2$) | |
| Example | | | | | | | | | | | |
| 13 | 100 | | 10 | 20 | 0.5 | 55.9 | 97 | 2 | 1820 | 63 | ⊚ |
| | | | | | | | 97 | 10 | 1800 | 61 | ⊚ |
| | | | | | | | 1002 | 2 | 1770 | 59 | ⊚ |

TABLE 7-continued

| | Composition (part by weight) | | | | | Water content of pellet (ppm) | Dwelling time in cylinder (min) | Tensile strength (kg/cm²) | Izod non-notch (kg·cm/cm²) | Molding flash |
|---|---|---|---|---|---|---|---|---|---|---|
| | A-1 | A-2 | B | C | E | F | | | | |
| | | | | | | | 1002 | 10 | 1710 | 55 | ⊙ |
| 14 | | 100 | 10 | 20 | 0.5 | 55.9 | 103 | 2 | 1850 | 65 | ⊙ |
| | | | | | | | 103 | 10 | 1820 | 64 | ⊙ |
| | | | | | | | 1005 | 2 | 1820 | 65 | ⊙ |
| | | | | | | | 1005 | 10 | 1800 | 62 | ⊙ |
| Comparative example | | | | | | | | | | | |
| 24 | 100 | | 0 | 0 | 0 | 42.9 | 100 | 2 | 1890 | 68 | ⊙ |
| | | | | | | | 100 | 10 | 1530 | 40 | X |
| | | | | | | | 989 | 2 | 1210 | 30 | X |
| | | | | | | | 989 | 10 | 820 | 15 | X |
| 25 | 100 | | 10 | 0 | 0 | 47.1 | 105 | 2 | 1860 | 66 | ⊙ |
| | | | | | | | 105 | 10 | 1600 | 53 | △ |
| | | | | | | | 1060 | 2 | 1250 | 33 | X |
| | | | | | | | 1060 | 10 | 890 | 21 | X |
| 26 | 100 | | 0 | 20 | 0 | 51.6 | 98 | 2 | 1800 | 59 | ⊙ |
| | | | | | | | 98 | 10 | 1540 | 49 | △ |
| | | | | | | | 1002 | 2 | 1230 | 34 | X |
| | | | | | | | 1002 | 10 | 810 | 20 | X |
| 27 | 100 | | 0 | 0 | 0.5 | 43.1 | 99 | 2 | 1830 | 64 | ⊙ |
| | | | | | | | 99 | 10 | 1510 | 50 | △ |
| | | | | | | | 998 | 2 | 1400 | 40 | X |
| | | | | | | | 998 | 10 | 930 | 25 | X |
| 28 | 100 | | 10 | 20 | 0 | 55.7 | 96 | 2 | 1800 | 60 | ⊙ |
| | | | | | | | 96 | 10 | 1510 | 45 | △ |
| | | | | | | | 1010 | 2 | 1210 | 31 | △ |
| | | | | | | | 1010 | 10 | 810 | 18 | X |
| 29 | 100 | | 10 | 0 | 0.5 | 47.4 | 103 | 2 | 1860 | 65 | ⊙ |
| | | | | | | | 103 | 10 | 1830 | 61 | ○ |
| | | | | | | | 993 | 2 | 1560 | 48 | △ |
| | | | | | | | 993 | 10 | 1010 | 31 | X |
| 30 | 100 | | 0 | 20 | 0.5 | 51.6 | 104 | 2 | 1790 | 58 | ⊙ |
| | | | | | | | 104 | 10 | 1720 | 50 | ○ |
| | | | | | | | 1005 | 2 | 1350 | 40 | X |
| | | | | | | | 1005 | 10 | 960 | 30 | X |
| 31 | | 100 | 0 | 0 | 0 | 42.9 | 97 | 2 | 1890 | 68 | ⊙ |
| | | | | | | | 97 | 10 | 1600 | 45 | △ |
| | | | | | | | 1010 | 2 | 1350 | 37 | X |
| | | | | | | | 1010 | 10 | 950 | 25 | X |
| 32 | | 100 | 10 | 0 | 0 | 47.1 | 95 | 2 | 1890 | 68 | ⊙ |
| | | | | | | | 95 | 10 | 1710 | 60 | ○ |
| | | | | | | | 1060 | 2 | 1420 | 45 | △ |
| | | | | | | | 1060 | 10 | 1010 | 50 | X |
| 33 | | 100 | 0 | 20 | 0 | 51.6 | 103 | 2 | 1840 | 61 | ⊙ |
| | | | | | | | 103 | 10 | 1600 | 53 | ○ |
| | | | | | | | 991 | 2 | 1290 | 40 | △ |
| | | | | | | | 991 | 10 | 980 | 28 | X |
| 34 | | 100 | 0 | 0 | 0.5 | 43.1 | 100 | 2 | 1890 | 66 | ⊙ |
| | | | | | | | 100 | 10 | 1750 | 61 | ○ |
| | | | | | | | 994 | 2 | 1510 | 54 | △ |
| | | | | | | | 994 | 10 | 1030 | 34 | X |
| 35 | | 100 | 10 | 20 | 0 | 55.7 | 98 | 2 | 1810 | 63 | ⊙ |
| | | | | | | | 98 | 10 | 1600 | 51 | ○ |
| | | | | | | | 1002 | 2 | 1480 | 48 | △ |
| | | | | | | | 1002 | 10 | 1120 | 20 | X |
| 36 | | 100 | 10 | 0 | 0.5 | 47.4 | 98 | 2 | 1870 | 67 | ⊙ |
| | | | | | | | 98 | 10 | 1810 | 64 | ○ |
| | | | | | | | 1006 | 2 | 1570 | 50 | △ |
| | | | | | | | 1006 | 10 | 1180 | 37 | X |
| 37 | | 100 | 0 | 20 | 0.5 | 51.6 | 94 | 2 | 1810 | 60 | ⊙ |
| | | | | | | | 94 | 10 | 1710 | 51 | ⊙ |
| | | | | | | | 1020 | 2 | 1410 | 45 | △ |
| | | | | | | | 1020 | 10 | 1300 | 40 | △ |

EXAMPLES 15 TO 19

Pellets for molding were obtained in the same manner as in Example 1 by using 100 parts by weight of polyethylene terephthalate having an intrinsic viscosity of 0.7 dl/g (measured in a 1:1 mixture of phenol and tetrachloroethane at 23° C.), Bellpet PBK-1 (trade name, manufactured by Kanebo K.K.) as Component (A), 10 parts by weight of Epikote 828 (trade name, manufactured by Yuka Shell K.K., epoxy equivalent: 190) as Component (B), 25 parts by weight of an ethylene.propylene block copolymer BC-8Q (trade name, manufactured by Mitsubishi Petrochemical Co., Ltd) as Component (C), 3 parts by weight of BONDFAST BF2B, ethylene/-glycidylmethyacrylate copolymer name, manufactured by Sumitomo Kagaku K.K., ethylene.glycidyl methacrylate copolymer) as Component (D), 0.5 part by weight of a compound shown in Table 8 as Component (E) and 30% by weight of a glass fiber T198H (trade name, manufactured by Nippon Denki Glass K.K.) as Component (F).

After the pellets obtained was maintained at 280° C. for 5, 15 and 30 minutes, MFR was measured. The results are shown in Table 8.

COMPARATIVE EXAMPLES 38 TO 40

Pellets for molding were obtained in the same manner as in Examples 15 to 19. The results are shown in Table 8.

TABLE 8

| | | MFR (g/10 min) | | |
|---|---|---|---|---|
| | Stabilizer | 5 min | 15 min | 30 min |
| Comparative example 38 | None | 20 | 35 | 65 |
| Example 15 | Compound A (pentaerythritol phosphorus type) | 12 | 13 | 13 |
| Example 16 | Compound B (pentaerythritol phosphorus type) | 13 | 15 | 18 |
| Example 17 | Compound C (pentaerythritol phosphourus type) | 13 | 14 | 16 |
| Example 18 | Compound D (non-pentaerythritol phosphorus type) | 16 | 25 | 38 |
| Example 19 | Compound E (non-pentaerythritol phosphorus type) | 18 | 26 | 35 |
| Comparative example 39 | Compound F (sulfur type) | 21 | 38 | 59 |
| Comparative example 40 | Compound G (Phenol type) | 20 | 34 | 62 |

Compound A

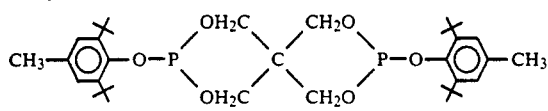

Compound B

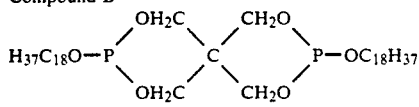

Compound C

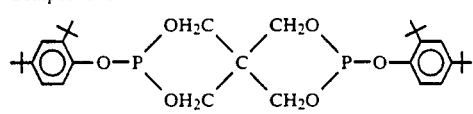

Compound D

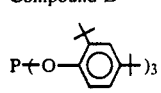

Compound E

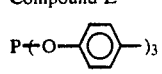

Compound F

Compound G

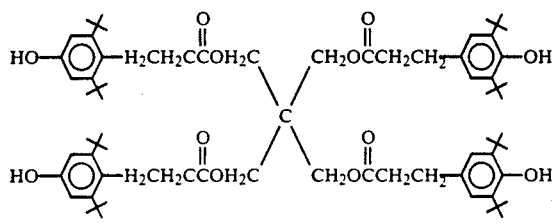

EXAMPLES 20 TO 25

Polyethylene terephthalate having an intrinsic viscosity of 0.7 dl/g (measured in a 1:1 mixture of phenol and tetrachloroethane at 23° C.), Bellpet PBK-1 (trade name, manufactured by Kanebo K.K.) as Component (A), a bisphenol A type epoxy resin Epikote 828 (trade name, manufactured by Yuka Shell Epoxy K.K., epoxy equivalent: 190) as Component (B), a high impact polystyrene Dialex HT76 (trade name, manufactured by Mitsubishi Monsant K.K.) as Component (C), a styrene-maleic anhydride copolymer DAILARK 250 (trade name, manufactured by Sekisui Kagaku K.K.) as Component (D), pentaerythritol type phosphite MARK PEP36 (trade name, manufactured by Adeca Argus K.K.) as Component (E) and a glass fiber T198H (trade name, manufactured by Nippon Denki Glass K.K.) as Component (F) were mixed at formulation ratios shown in Table 9 (Component (F) formulated was 30% by weight based on the whole composition) by a tumbler having a volume of 10 liter. Subsequently, the mixture was melted and kneaded by using a monoaxial extruder having a screw diameter of 40 mm equipped with a bent while setting a cylinder temperature at 270° C., and then strand cut to obtain pellets for molding. After the pellets obtained were dried by using a hot-air drying machine at 130° C. for 5 hours, a test strip for evaluation was obtained by using a 6-ounce injection molding machine N-100BII (trade name, manufactured by Nippon Seikosho K.K.), setting a cylinder temperature at 265° C., and employing a mold temperature of 90° C., a cooling time of 20 seconds and a total molding cycle of 35 seconds (average dwelling time in a cylinder: 2 minutes), and tensile strength was measured. The results are shown in Table 9. From Table 9, it can be seen that weld strength is lowered in Comparative examples in which Component (D) is not used or an appropriate amount of Component (D) is not contained.

TABLE 9

| | Composition (parts by weight) | | | | | | Tensile strength of non-weld portion (kg/cm$^2$) | Tensile strength of weld portion (kg/cm$^2$) |
|---|---|---|---|---|---|---|---|---|
| | A | B | C | D | E | F | | |
| Example 20 | 100 | 10 | 20 | 1 | 0.5 | 56.4 | 1910 | 980 |
| Example 21 | 100 | 10 | 20 | 3 | 0.5 | 57.2 | 1960 | 1020 |
| Example 22 | 100 | 10 | 20 | 8 | 0.5 | 59.4 | 1990 | 1000 |
| Example 23 | 100 | 10 | 20 | 0 | 0.5 | 55.9 | 1800 | 620 |
| Example 24 | 100 | 10 | 20 | 0.05 | 0.5 | 55.8 | 1820 | 630 |
| Example 25 | 100 | 10 | 20 | 15 | 0.5 | 62.4 | 1990 | 970 |

As described above, in the polyethylene terephthalate composition of the present invention, even when a slight amount of water exists at the time of molding working or the dwelling time in a working machine under heated state is relatively long, almost no deterioration of a product molded is observed, and also fluidity is good and stable moldability can be exhibited. Thus, formation of molding flash of a molded product can be minimized, and also a product excellent in mechanical and physical properties can be obtained. Accordingly, strict control of moistureproof molding materials and strict control of molding conditions as in the prior art can be alleviated to a great extent.

We claim:

1. A polyethylene terephthalate composition comprising:
   (A) 100 parts by weight of polyethylene terephthalate,
   (B) 3 to 25 parts by weight of a bisphenol A type epoxy resin having an epoxy equivalent of 1000 or less,
   (C) 10 to 50 parts by weight of a thermoplastic resin,
   (D) 0.5 to 8 parts by weight of a modified thermoplastic resin containing at least one epoxy group, carboxyl group or carboxylic anhydride in a molecular chain of one molecule,
   (E) 0.1 to 2 parts by weight of a phosphorus type stabilizer having the structure represented by the formula:

$(RO)_3P$ wherein R represents a hydrocarbon or cyclic hydrocarbon having 2 to 20 carbon atoms or at least one selected from the group consisting of:

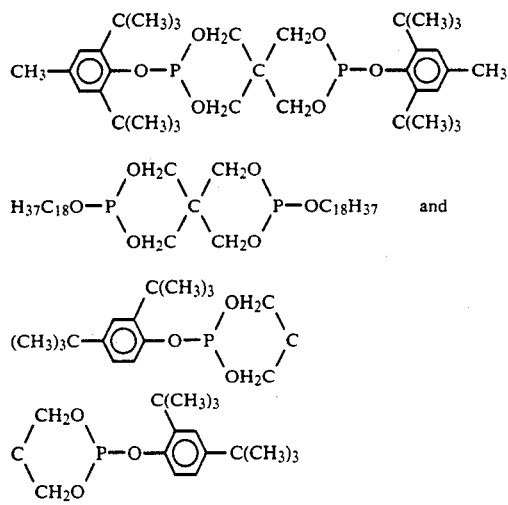

and
   (F) 5 to 150 parts by weight of a glass fiber.

2. The composition according to claim 1, which comprises:
   (A) 100 parts by weight of polyethylene terephthalate,
   (B) 3 to 20 parts by weight of a bisphenol A type epoxy resin having an epoxy equivalent of 1000 or less,
   (C) 10 to 45 parts by weight of a thermoplastic resin,
   (D) 0.5 to 8 parts by weight of a modified thermoplastic resin containing at least one epoxy group, carboxyl group or carboxylic anhydride in a molecular chain of one molecule,
   (E) 0.15 to 1.8 parts by weight of a phosphorus type stabilizer and
   (F) 10 to 130 parts by weight of a glass fiber.

3. The composition according to claim 1, which comprises:
   (A) 100 parts by weight of polyethylene terephthalate,
   (B) 3 to 15 parts by weight of bisphenol A type epoxy resin having an epoxy equivalent of 1000 or less,
   (C) 21 to 40 parts by weight of a thermoplastic resin,
   (D) 1 to 5 parts by weight of a modified thermoplastic resin containing at least one epoxy group, carboxyl group or carboxylic anhydride in a molecular chain of one molecule,
   (E) 0.2 to 1.5 parts by weight of a phosphorus type stabilizer and
   (F) 10 to 130 parts by weight of a glass fiber.

4. The composition according to claim 1, wherein said Component (C) is at least one selected from a styrene type resin, an olefin type resin, a polyamide resin, polyphenylene ether, polycarbonate, polyphenylene sulfide and polyacrylate.

5. The composition according to claim 1, wherein said Component (C) is an olefin type resin.

6. The composition according to claim 1, wherein said Component (C) is at least one selected from polypropylene and an ethylene.propylene block copolymer.

7. The composition according to claim 1, wherein said Component (E) is a pentaerythritol derivative.

8. The composition according to claim 1, wherein said Component (D) is at least one selected from ethylene.glycidyl (meth)acrylate and ethylene.vinyl acetate.glycidyl methacrylate.

9. A polyethylene terephthalate composition comprising:
   A) 100 parts by weight of polyethylene terephthalate,
   (B) 3 to 25 parts by weight of a bisphenol A type epoxy resin having an epoxy equivalent of 1000 or less,
   (C) 10 to 50 parts by weight of a thermoplastic resin,
   (D) 0 to 10 parts by weight of a modified thermoplastic resin containing at least one epoxy group, carboxyl group or carboxylic anhydride in a molecular chain of one molecule,
   (E) 0.1 to 2 parts by weight of a phosphorus type stabilizer having the structure represented by the formula:

$(RO)_3P$ wherein R represents a hydrocarbon or cyclic hydrocarbon having 2 to 20 carbon atoms, and
   (F) 5 to 150 parts by weight of a glass fiber.

* * * * *